(12) United States Patent
Fukatani et al.

(10) Patent No.: US 10,700,358 B2
(45) Date of Patent: Jun. 30, 2020

(54) COMPOSITION FOR PREPARING POROUS INSULATING LAYER, ELECTRODE FOR NON-AQUEOUS RECHARGEABLE LITHIUM BATTERY, NON-AQUEOUS RECHARGEABLE LITHIUM BATTERY, METHOD OF PREPARING ELECTRODE FOR NON-AQUEOUS RECHARGEABLE LITHIUM BATTERY

(71) Applicant: Samsung SDI Co., Ltd., Yongin-si, Gyeonggi-do (KR)

(72) Inventors: Tomoyuki Fukatani, Yokohama (JP); Koji Hoshiba, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 38 days.

(21) Appl. No.: 16/181,252

(22) Filed: Nov. 5, 2018

(65) Prior Publication Data

US 2019/0140283 A1    May 9, 2019

(30) Foreign Application Priority Data

Nov. 8, 2017   (JP) .................................. 2017-215926
Apr. 25, 2018  (KR) ......................... 10-2018-0048128

(51) Int. Cl.
*H01M 4/62*    (2006.01)
*H01M 4/36*    (2006.01)
(Continued)

(52) U.S. Cl.
CPC ........... *H01M 4/628* (2013.01); *H01M 2/145* (2013.01); *H01M 2/166* (2013.01);
(Continued)

(58) Field of Classification Search
CPC .... H01M 2/166; H01M 2/1686; H01M 4/622; H01M 4/628
(Continued)

(56) References Cited

U.S. PATENT DOCUMENTS 6,096,456 A * 8/2000 Takeuchi ................. H01G 9/02
429/249
2002/0036884 A1* 3/2002 Shimamoto ............ H01G 9/038
361/502
(Continued)

FOREIGN PATENT DOCUMENTS

EP    2838142 A1    2/2015
JP    10-289617 A   10/1998
(Continued)

OTHER PUBLICATIONS

EPO Extended Search Report dated Jan. 24, 2019, for corresponding European Patent Application No. 18203706.9 (9 pages).

*Primary Examiner* — James M Erwin
(74) *Attorney, Agent, or Firm* — Lewis Roca Rothgerber Christie LLP

(57) ABSTRACT

A composition for preparing a porous insulating layer for a non-aqueous electrolyte rechargeable battery, the composition including a polyolefin-based polymer particle, a binder, an insulating inorganic particle, and a solvent including water and an organic solvent. The binder includes a polymer, and the polymer includes at least one monomer unit (A) represented by Chemical Formula 1 and at least one monomer unit (B) represented by Chemical Formula 2, where a weight ratio (A)/(B) of the monomer unit (A) and the monomer unit (B) ranges from about 40/60 to about 80/20:

(Continued)

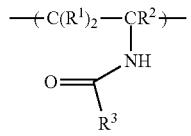

Chemical Formula 1

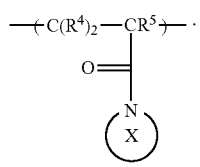

Chemical Formula 2

10 Claims, 1 Drawing Sheet

(51) Int. Cl.
  *H01M 10/0525* (2010.01)
  *H01M 4/04* (2006.01)
  *H01M 4/139* (2010.01)
  *H01M 2/14* (2006.01)
  *H01M 4/13* (2010.01)
  *H01M 2/16* (2006.01)
(52) U.S. Cl.
  CPC ....... *H01M 2/1686* (2013.01); *H01M 4/0404* (2013.01); *H01M 4/13* (2013.01); *H01M 4/139* (2013.01); *H01M 4/366* (2013.01); *H01M 4/622* (2013.01); *H01M 10/0525* (2013.01)
(58) Field of Classification Search
  USPC ........................................................ 429/215
  See application file for complete search history.

(56) References Cited

U.S. PATENT DOCUMENTS

| | | |
|---|---|---|
| 2006/0158493 A1 | 7/2006 | Nakano et al. |
| 2007/0072083 A1 | 3/2007 | Ikuta et al. |
| 2009/0023073 A1 | 1/2009 | Okada et al. |
| 2009/0232988 A1 | 9/2009 | Hazlewood et al. |
| 2010/0062146 A1 | 3/2010 | Hayashi et al. |
| 2011/0206977 A1 | 8/2011 | Ikeda |
| 2014/0287308 A1 | 9/2014 | Okada et al. |
| 2015/0050533 A1 | 2/2015 | Nam et al. |

FOREIGN PATENT DOCUMENTS

| | | |
|---|---|---|
| JP | 2002-251999 A | 9/2002 |
| JP | 2005-174792 A | 6/2005 |
| JP | 2008-166113 A | 7/2008 |
| JP | 2008-226566 A | 9/2008 |
| JP | 2009-43715 A | 2/2009 |
| JP | 4524713 B2 | 8/2010 |
| JP | 2015-37077 A | 2/2015 |
| JP | 2015-88253 A | 5/2015 |
| JP | WO2015/111663 A1 | 7/2015 |
| JP | 6079238 B2 | 2/2017 |

\* cited by examiner

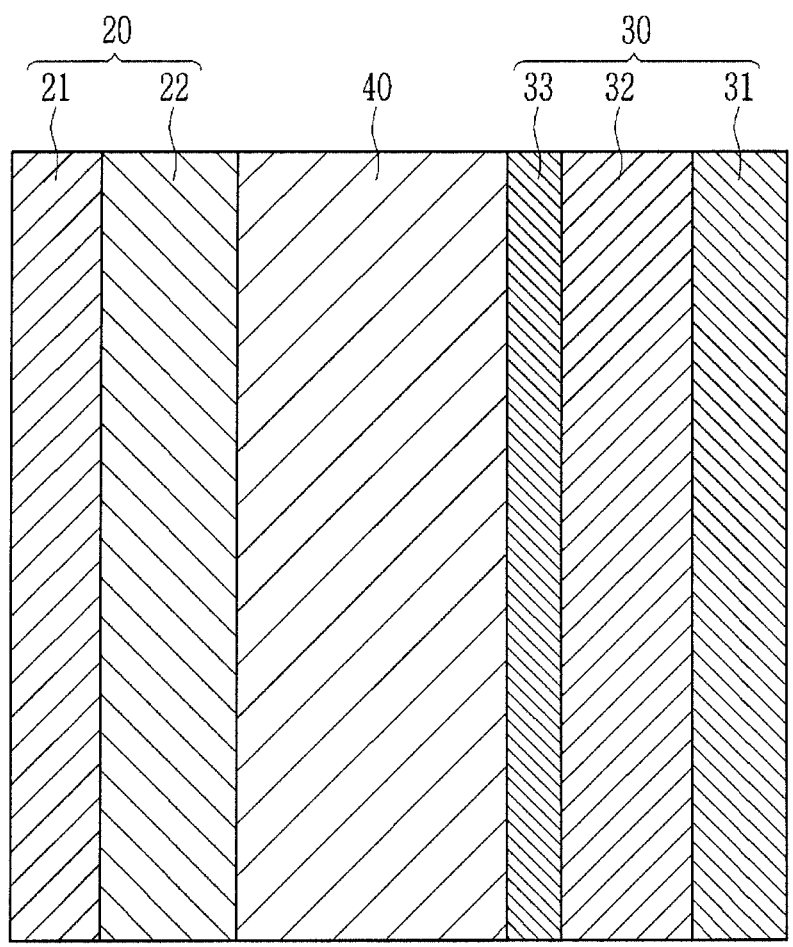

COMPOSITION FOR PREPARING POROUS INSULATING LAYER, ELECTRODE FOR NON-AQUEOUS RECHARGEABLE LITHIUM BATTERY, NON-AQUEOUS RECHARGEABLE LITHIUM BATTERY, METHOD OF PREPARING ELECTRODE FOR NON-AQUEOUS RECHARGEABLE LITHIUM BATTERY

CROSS-REFERENCE TO RELATED APPLICATION

This application claims priority to and the benefit of Japanese Patent Application No. 2017-215926 filed in the Japanese Patent Office on Nov. 8, 2017 and Korean Patent Application No. 10-2018-0048128 filed in the Korean Intellectual Property Office on Apr. 25, 2018, the entire content of each of which is incorporated herein by reference.

BACKGROUND

1. Field

One or more aspects of embodiments of the present disclosure are directed toward a composition for preparing a porous insulating layer, an electrode for a non-aqueous electrolyte rechargeable battery, a non-aqueous electrolyte rechargeable battery, and a method of preparing an electrode for a non-aqueous electrolyte rechargeable battery.

2. Description of the Related Art

A non-aqueous electrolyte rechargeable battery is required (or desired) to have relatively high energy density and simultaneously, secure safety. One method for achieving these characteristics has been to utilize a shut-down function of increasing internal resistance of the battery by closing pores of a separator through melting during abnormal overheating due to an internal short circuit of the battery and/or the like.

In addition, a method of preventing the internal short circuit by forming a porous insulating layer (e.g., a heat-resistant ceramic layer) directly on the surface of an electrode has been suggested, aside from (or in addition to) the shut-down function by the separator.

A comparable electrode including such porous heat-resistant insulating layer may be prepared, for example, as follows. First, an active material-containing paste as aqueous slurry is coated on a current collector and then, dried and compressed to form an active material layer. On the active material layer, material slurry for a porous insulating layer is coated and dried to form the porous insulating layer.

In addition, the porous insulating layer may have a shut-down function by including a polymer particle, such as a polyolefin, in the porous insulating layer.

The porous insulating layer may have a thickness of less than or equal to about 10 μm. Here, an average particle diameter of polymer particles of a polyolefin-based polymer and/or the like should be smaller than the thickness of the porous insulating layer. For example, a dispersion in which a polyolefin-based polymer having the average particle diameter is dispersed in water as a dispersive medium is commercially available. As described above, an active material layer, for example, a negative active material layer, may be formed by using an active material-containing paste as aqueous slurry.

However, when material slurry of the porous insulating layer is coated on the active material layer, the active material layer may be swollen due to moisture in the material slurry of the porous insulating layer, and thus density of the active material layer may be decreased. For example, since the active material layer may still have pores after the compression, some of the moisture in the material slurry of the porous insulating layer may permeate into the active material layer, when the material slurry is coated thereon. As a result, a thickness of the active material layer is increased. Accordingly, when a comparable aqueous material slurry of the porous insulating layer includes the polyolefin-based polymer, the thickness of the active material layer may be excessively increased.

Conversely, when a ratio of water is reduced to increase a ratio of an organic solvent in the material slurry, stability of the polyolefin-based polymer particle is deteriorated, and thus an irreversible agglomerate may be generated. When the agglomeration is severe, the material slurry may be gellized. When the agglomeration is not severe, it may be difficult to form the thin porous insulating layer.

SUMMARY

One or more aspects of embodiments of the present disclosure are directed toward a composition for preparing a porous insulating layer capable of suppressing layer thickness increase of an active material layer when the porous insulating layer is being coated thereon, and having improved dispersion of a polyolefin-based polymer particle, and also, improved coating properties.

One or more aspects of the present embodiments are directed toward a method of preparing an electrode for a non-aqueous electrolyte rechargeable battery using the composition for preparing the porous insulating layer.

One or more aspects of the present embodiments are directed toward an electrode for a non-aqueous electrolyte rechargeable battery and a non-aqueous electrolyte rechargeable battery prepared by the method of the present embodiments.

According to an embodiment, a composition for preparing a porous insulating layer for a non-aqueous electrolyte rechargeable battery includes a polyolefin-based polymer particle; a binder; an insulating inorganic particle; and a solvent including water and an organic solvent, the binder includes a polymer, the polymer includes at least one monomer unit (A) represented by Chemical Formula 1 and at least one monomer unit (B) represented by Chemical Formula 2, and in the polymer, a weight ratio (A)/(B) of the monomer unit (A) to the monomer unit (B) ranges from about 40/60 to about 80/20:

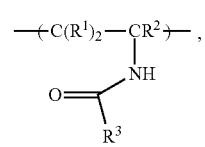

Chemical Formula 1 wherein, $R^1$, $R^2$, and $R^3$ are each independently a hydrogen atom or a C1 to C3 alkyl group, Chemical Formula 2

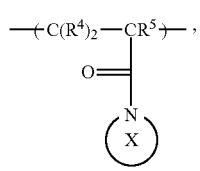

wherein, $R^4$ and $R^5$ are each independently a hydrogen atom or a C1 to C3 alkyl group, X is selected from a heterocyclic group where at least one hydrogen is substituted with a C1 to C3 alkyl group, and an unsubstituted heterocyclic group, wherein X includes at least one nitrogen atom as a ring-forming atom.

The polymer may include less than or equal to about 10 wt % of an ionic monomer unit.

X may include a nitrogen atom and an oxygen atom.

A boiling point of the organic solvent may be greater than or equal to about 160° C. at 1 atm.

The organic solvent may include a glycolalkylether-based compound.

In another embodiment, an electrode for a non-aqueous electrolyte rechargeable battery includes a current collector, an active material layer formed on the current collector and including an active material capable of electrochemically intercalating and deintercalating lithium ions; and a porous insulating layer formed on the active material layer and prepared using the composition for preparing the porous insulating layer.

The active material layer may include a binder for an active material layer and a distance between a Hansen solubility parameter of the binder for the active material layer and a Hansen solubility parameter of the organic solvent may be greater than or equal to about 8.0 $(MPa)^{1/2}$.

In another embodiment, a non-aqueous electrolyte rechargeable battery includes the electrode of the present embodiments.

In another embodiment, a method of preparing an electrode for a non-aqueous electrolyte rechargeable battery includes forming a porous insulating layer using the composition for preparing the porous insulating layer on an active material layer formed on a current collector and including an active material capable of electrochemically intercalating and deintercalating lithium ions.

According to an embodiment, the composition for preparing the porous insulating layer for a non-aqueous electrolyte rechargeable battery may suppress or reduce a thickness increase of an active material layer and thus may show excellent dispersibility of the polyolefin-based polymer particle and, also, excellent coating property and accordingly, may form a uniform porous insulating layer including the polyolefin-based polymer particle and may improve the safety of the non-aqueous electrolyte rechargeable battery.

BRIEF DESCRIPTION OF THE DRAWING

These and/or other aspects will become apparent and more readily appreciated from the following description of the embodiments, taken in conjunction with the accompanying drawing, The drawing is a schematic view showing a structure of a non-aqueous electrolyte rechargeable battery according to an embodiment of the present disclosure.

DETAILED DESCRIPTION

Hereinafter, referring to the drawing, one example embodiment is illustrated in more detail.

Elements having substantially the same functional structure in the present specification and drawing are assigned the same numeral and will not be repetitively illustrated.

1. Composition for Preparing Porous Insulating Layer

A composition for preparing a porous insulating layer according to an embodiment of the present invention is described. The composition for preparing the porous insulating layer according to the present embodiment may be used for forming a porous insulating layer (e.g., a heat-resistant ceramic layer) on an active material layer of an electrode for a non-aqueous electrolyte rechargeable battery.

The composition for preparing the porous insulating layer according to the present embodiment includes a polyolefin-based polymer particle, a binder, insulating inorganic particle, and a solvent including water and an organic solvent.

(1.1 Insulating Inorganic Particle)

The composition for preparing the porous insulating layer may include an insulating inorganic particle. The insulating inorganic particle may be a solid main component of the composition for preparing the porous insulating layer. The insulating inorganic particle ensures insulation properties between the separator and the active material layer and prevents or reduces undesirable internal short-circuit.

The insulating inorganic particle is not particularly limited, and may include, for example, oxide particles (such as iron oxide, silica ($SiO_2$), alumina ($Al_2O_3$), $TiO_2$, $BaTiO_2$, ZrO, and/or the like); nitride particles (such as boron nitride, aluminum nitride, silicon nitride, and/or the like); non-soluble ion crystalline particles (such as calcium fluoride, barium fluoride, barium sulfate, and/or the like); covalent bond-type (or kind) crystalline particles (such as silicon, diamond, and/or the like); clay particles (such as montmorillonite and/or the like); materials derived from minerals (such as boehmite, zeolite, apatite, kaolin, mullite, spinel, olivine, and/or the like); and/or artificial (or synthetic) products of the above-described materials.

In some embodiments, the insulating inorganic particle may include conductive particles of metal particles, oxide particles (such as $SnO_2$, tin-indium oxide (ITO), and/or the like), and/or carbonaceous particles (such as carbon black, graphite and/or the like), which are surface-treated with materials having electrical insulation properties to be particulates having electrical insulation properties.

An average particle diameter of the insulating inorganic particle is not particularly limited and may be, for example, greater than or equal to about 0.01 μm and less than or equal to about 5 μm, for example, greater than or equal to about 0.1 μm and less than or equal to about 1 μm.

An amount of the insulating inorganic particle in the composition for preparing the porous insulating layer may be, for example, greater than or equal to about 20 wt % and less than or equal to about 80 wt %, and in some embodiments, greater than or equal to about 30 wt % and less than or equal to about 70 wt %, based on a solid content of the composition for preparing the porous insulating layer.

(1.2 Polyolefin-Based Polymer Particle)

The composition for preparing the porous insulating layer according to the present embodiment may include a polyolefin-based polymer particle.

The polyolefin-based polymer particle has a relatively low melting point, and thus it may be melted at the time of abnormal heating of the non-aqueous electrolyte rechargeable battery and may block or reduce the transport of lithium ions. Accordingly, safety performance of the non-aqueous electrolyte rechargeable battery may be further improved. The polyolefin-based polymer particle may be uniformly dispersed in a dispersive medium including water. However, when an inclusion ratio of water in the dispersive medium is decreased, dispersion of the polyolefin-based polymer particle may be decreased. In addition, the polyolefin-based polymer particles may be agglomerated, when a solvent is removed after coating the material slurry for a porous insulating layer.

Accordingly, the composition for preparing the porous insulating layer of the present embodiment includes a specific binder (which will be described later), so that the polyolefin-based polymer particle may be uniformly dispersed in the composition for preparing the porous insulating layer and in a porous insulating layer formed therefrom, regardless of the water ratio in a dispersive medium. As a result, coating property of the composition for preparing the porous insulating layer may be improved.

The polyolefin-based polymer particle may be, for example, a polyethylene-based polymer particle, a polypropylene-based polymer particle, and/or the like. A particle-shaped polyolefin-based polymer may be, for example, available as a polyethylene wax, a polypropylene wax, and/or the like.

An average particle diameter of the polyolefin-based polymer particle is not particularly limited, but may be, for example, greater than or equal to about 0.5 μm and less than or equal to about 4 μm, or greater than or equal to about 0.7 μm and less than or equal to about 2 μm.

In some embodiments, the porous insulating layer may be formed as a relatively thin (for example less than or equal to about 4 μm) film. Accordingly, the average particle diameter of the polyolefin-based polymer particle needs to be relatively small. When the polyolefin-based polymer particle has a small particle diameter, dispersion stability may be decreased. However, in an embodiment of the present disclosure, the polyolefin-based polymer particle may be uniformly dispersed in the porous insulating layer without deteriorating stability due to the polymer including monomer units (A) and (B) as a binder (that will be described later). In the present specification, the average particle diameter refers to a volume-based cumulative frequency D50 particle diameter and the average particle diameter may be measured by a laser diffraction•scattering-type particle distribution meter.

An amount of the polyolefin-based polymer particle in the composition for preparing the porous insulating layer may be for example greater than or equal to about 20 wt % and less than or equal to about 80 wt %, based on a solid content of the composition for preparing the porous insulating layer.

(1.3 Binder)

The composition for preparing the porous insulating layer includes a binder. The binder is used to bind each material in a porous insulating layer, for example, the polyolefin-based polymer particle, the insulating inorganic particle, and/or the like. In addition, in the present embodiment, the binder may include a particular (specific) polymer described hereinafter and thus may improve dispersion stability of the polyolefin-based polymer particle in the composition for preparing the porous insulating layer.

The polymer used as the binder may be appropriately dissolved in a solvent described later.

In an embodiment, the binder includes the following polymer and the polymer may include at least one monomer unit (A) represented by Chemical Formula 1 and at least one monomer unit (B) represented by Chemical Formula 2:

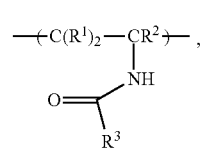

Chemical Formula 1 wherein, $R^1$, $R^2$, and $R^3$ are independently a hydrogen atom or a C1 to C3 alkyl group,

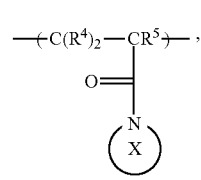

Chemical Formula 2 wherein, $R^4$ and $R^5$ are independently a hydrogen atom or a C1 to C3 alkyl group, and X is a heterocyclic group where at least one hydrogen is substituted with a C1 to C3 alkyl group, or an unsubstituted heterocyclic group, wherein X includes at least one nitrogen atom as a ring-forming atom.

In the polymer, the weight ratio (A)/(B) of the monomer unit (A) to the monomer unit (B) may range from about 40/60 to about 80/20. In some embodiments, the polymer may further include less than or equal to about 10 wt % of an ionic monomer unit (described later), for example, less than about 10 wt % of the ionic monomer unit.

The composition for preparing the porous insulating layer according to the present embodiments includes the polymer as a binder, and thus dispersion stability of the polyolefin-based polymer particle along with the insulating inorganic particle may be improved. In addition, the polymer may be appropriately dissolved even in an organic solvent. As a result, a sequential viscosity change and, simultaneously, gelation of the composition for preparing the porous insulating layer may be prevented or reduced. Accordingly, coating property of the composition for preparing the porous insulating layer may be improved. In addition, since the polymer has excellent solubility in an organic solvent, a water content in the composition for preparing the porous insulating layer may be reduced. As a result, the composition may suppress a thickness increase of an active material layer when coated thereon, and thus may show excellent (or suitable) dispersity of the polyolefin-based polymer particle.

In Chemical Formulae 1 and 2, the C1 to C3 alkyl group in $R^1$ to $R^5$ may be a methyl group, an ethyl group, an n-propyl group, an isopropyl group, and/or the like. In some embodiments, $R^1$ to $R^5$ may each independently be a hydrogen atom or a methyl group, and in some embodiments, $R^1$ to $R^5$ may each be a hydrogen atom.

In Chemical Formula 2, the ring constituting the ring X may be, for example, a heterocyclic group including a nitrogen atom (such as a pyrazolyl group, a pyrazolidinyl group and/or the like), and/or a heterocyclic group including a nitrogen atom and an oxygen atom (such as a morpholinyl group and/or the like). In some embodiments, the ring constituting the ring X may be a heterocyclic group including a nitrogen atom and an oxygen atom, for example, a morpholinyl group.

The number of ring-forming atoms of the ring X is not particularly limited, but may be, for example, 4 to 10, for example, 4 to 7.

At least one hydrogen atom in the ring X may be replaced (e.g., substituted) by a C1 to C3 alkyl group, for example, a methyl group, an ethyl group, an n-propyl group, an isopropyl group, and/or the like. However, in some embodiments, all of the hydrogen atoms in the ring X may not be replaced (e.g., the ring X may be unsubstituted).

A weight ratio (A)/(B) of the monomer unit (A) to the monomer unit (B) may be about 40/60 to about 80/20, and in some embodiments, about 50/50 to about 75/25. When the weight ratio (A)/(B) is less than about 40/60, the polymer may not be dissolved in the composition for preparing the porous insulating layer, and thus the composition for preparing the porous insulating layer may be easily gellized. When the weight ratio (A)/(B) is greater than about 80/20, dispersibility of the insulating inorganic particle may deteriorate, and a precipitate may be easily formed in the composition for preparing the porous insulating layer. Accordingly, when the weight ratio (A)/(B) is less than or greater than the above-recited range, the composition for preparing the porous insulating layer may be difficult to coat.

The polymer (of the binder) may include an ionic monomer unit. Herein, a content of the ionic monomer unit may be less than or equal to about 10 wt %, for example, less than 10 wt %, less than or equal to about 5 wt %, or less than about 5 wt %.

The ionic monomer unit may improve dispersion of the inorganic insulating particle. However, the ionic monomer unit may also deteriorate affinity of the polymer for the polyolefin-based polymer particle. For example, when greater than about 10 wt % of the ionic monomer unit is included in the polymer, the affinity of the polymer for the polyolefin-based polymer particle may not be negligibly deteriorated (e.g., may be significantly (or noticeably) deteriorated), and thus dispersibility of the polyolefin-based polymer particle may be deteriorated. As a result, the composition for preparing the porous insulating layer may be easily gellized and thus difficult to coat.

In some embodiments, when the polymer includes the ionic monomer unit, the ionic monomer unit may be included in an amount of greater than or equal to about 0.1 wt %, for example, about 1.0 wt %, so as to improve dispersibility of the insulating inorganic particle.

The ionic monomer unit may be, for example, a monomer unit having a functional group having a plus (+) or minus (−) charge, for example, by an ionization in a solvent and/or the like. This ionic monomer unit may, for example, include a monomer unit such as a carboxyl group, a phosphoric acid group, and/or a sulfonic acid group.

The ionic monomer unit is not particularly limited, but may be, for example, a monomer unit (C) represented by Chemical Formula 3:

Chemical Formula 3

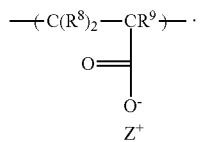

In Chemical Formula 3, $R^8$ and $R^9$ may each independently be a hydrogen atom or a C1 to C3 alkyl group, $Z^+$ may be a monovalent cation group, and $Z^+$ and $O^-$ may be bonded by an ionic bond.

In Chemical Formula 3, the C1 to C3 alkyl group in $R^8$ and $R^9$ may be a methyl group, an ethyl group, an n-propyl group, an isopropyl group, and/or the like.

In some embodiments, $R^8$ and $R^9$ may each independently be a hydrogen atom or a methyl group, and in some embodiments, $R^8$ and $R^9$ may each be a hydrogen atom.

$Z^+$ may be, for example, a proton, an ammonium ion, an organic cation, an inorganic cation (such as a metal ion, and/or the like), a metal complex and/or the like.

The organic cation may be selected from cation compounds of amines. The amines may be primary, secondary, or tertiary amines, and may be, for example, aliphatic amines (such as methyl amine, dimethyl amine, triethyl amine, monoethanolamine, diethanolamine, triethanolamine, ethylenediamine, N,N-diisopropylethylamine, hexamethylenediamine, and/or the like), aromatic amines (such as aniline and/or the like), and/or non-aromatic heterocyclic amines (such as pyrrolidine, piperidine, piperazine, morpholine, pyridine, pyridazine, pyrimidine, pyrazine, oxazole, thiazole, and/or the like).

In some embodiments, the polymer may include an additional monomer unit, in addition to the materials described above. For example, the polymer may include a monomer unit derived from a monomer such as (meth)acrylic acid ester, (meth)acrylonitrile, styrene, vinyl acetate, and/or the like.

The polymer may include the monomer units (A) and (B) in an amount of greater than or equal to about 80 wt %, for example, greater than or equal to about 90 wt %, or greater than or equal to about 95 wt %, based on a total amount of the polymer.

A binding form of the polymer included in the binder is not particularly limited, and the polymer may be a random copolymer, an alternating copolymer, a periodic copolymer, a block copolymer, and/or a graft copolymer.

A weight average molecular weight of the polymer included in the binder is not particularly limited, but may be, for example, greater than or equal to about 50,000 and less than or equal to about 2,000,000, and in some embodiments, greater than or equal to about 100,000 and less than or equal to about 1,000,000. The weight average molecular weight may be measured through gel permeation chromatography of converting polyethylene oxide (PEO) into a standard material.

The binder may include one kind of the polymer or more than one kind of the polymer of the present embodiments.

The binder may further include any suitable binder material in addition to the polymer.

An amount of the binder in the composition for preparing the porous insulating layer may be, for example, greater than or equal to about 2 wt % and less than or equal to about 10 wt %, and in some embodiments, greater than or equal to about 3 wt % and less than or equal to about 7 wt %, based on a solid content of the composition for preparing the porous insulating layer.

(1.4 Solvent)

The composition for preparing the porous insulating layer according to the present embodiment includes a solvent including water and an organic solvent. As described above, the composition for preparing the porous insulating layer uses the binder of the present embodiments and thus shows improved dispersibility of the polyolefin-based polymer particle. Further, the composition for preparing the porous insulating layer according to the present embodiment may include an organic solvent capable of preventing or reducing the swelling of an active material layer.

The organic solvent may be capable of mixing with water and capable of dissolving the aforementioned binder, simultaneously (or concurrently), and may include any suitable solvent without a particular limit. For example, organic solvents such as a glycolalkylether-based compound, an alcohol-based compound, and/or the like may be used alone or in a mixture of two or more. For example, the glycolalkylether-based compound may be appropriately used in terms of dispersibility of the insulating inorganic particle and the polyolefin-based polymer particle and/or solubility of the above binder.

The glycolalkylether-based compound may be, for example, monoalkylene glycol monoalkyl ether (such as ethylene glycol monomethyl ether, ethylene glycol monoethyl ether, and/or the like), dialkylene glycolmonoalkylether (such as diethylene glycol monomethyl ether, diethylene glycol monoethyl ether, and/or the like), trialkylene glycol monoalkylether (such as triethylene glycol monomethyl ether, triethylene glycol monoethyl ether, and/or the like), and/or any alkylene glycol monoalkyl ether having a polymerization degree of 3 or greater.

The carbon number of the alkoxy group of the glycolalkylether-based compound may not be particularly limited, but may be 1 to 4, 1 to 3, for example, 1 or 2.

The glycolalkylether-based compound may include an ethylene glycol backbone. For example, a suitable glycolalkylether-based compound may be triethylene glycol monomethylether, diethylene glycol monomethylether, and/or ethylene glycol monoethylether.

A boiling point of the organic solvent may be greater than or equal to about 130° C., and in some embodiments, greater than or equal to about 160° C. and less than or equal to about 300° C. For example, a boiling point of the organic solvent at 1 atm may be greater than or equal to about 160° C. When the boiling point of the organic solvent is within this range, the risk of the solvent volatility and a viscosity change caused by the solvent volatility during the formation of the porous insulating layer may be prevented or reduced, and a porous insulating layer having a uniform thickness may be formed.

The organic solvent may have, for example, a distance of greater than or equal to about 8.0 $(MPa)^{1/2}$ between a Hansen solubility parameter (hereinafter, referred to as "HSP") of a binder in an active material layer and HSP of the organic solvent. When the distance between the HSP of the organic solvent included in the composition for preparing the porous insulating layer and the HSP of the binder in the active material layer satisfies this relationship, the composition for preparing the porous insulating layer may prevent or reduce the swelling of the active material layer when the composition is coated on the active material layer. Accordingly, a thickness increase of the active material layer of an electrode may be further prevented or reduced.

Herein, HSP is an extended concept of dividing Hildebrand's solubility parameter (SP) derived with a regular solution theory and calculated from evaporation of latent heat and density of a material into three components including polarity force $\delta P$, a hydrogen bond force $\delta H$, and dispersion force $\delta D$. HSP is expressed as a one point in a three-dimensional space. Accordingly, an HSP ratio of the binder in the active material layer and the solvent may be expressed as a distance (HSP distance) between two points in the three-dimensional space represented by Equation 1: On the other hand, in the present specification, HSP, a distance between HSP's, and each component (polarity force $\delta_P$, a hydrogen bond force $\delta_H$, dispersion force $\delta_D$) are marked based on a unit of "$(MPa)^{1/2}$", unless particularly defined.

$$\text{HSP distance} = \{4 \times (\delta_{D(binder)} - \delta_{D(solvent)})^2 + (\delta_{P(binder)} - \delta_{P(solvent)})^2 + (\delta_{H(binder)} - \delta_{H(solvent)})^2\}^{1/2}. \quad \text{Equation 1}$$

In Equation 1, $\delta_{D(binder)}$ denotes dispersion force of a binder in an active material layer, $\delta_{D(solvent)}$ denotes dispersion force of an organic solvent in the active material layer, $\delta_{P(binder)}$ denotes polarity force of the binder in the active material layer, $\delta_{P(solvent)}$ denotes polarity force of the organic solvent, $\delta_{H(binder)}$ denotes a hydrogen bond force of the binder in the active material layer, and $\delta_{H(solvent)}$ denotes a hydrogen bond force of the organic solvent.

The upper limit of the HSP distance is not particularly limited, but it may be less than or equal to about 30 for a general solvent.

When a plurality of organic solvents are mixed, HSP of the mixed solvent may be calculated from HSP of each organic solvent and a mixing volume ratio thereof, and a distance between this HSP (the HSP of the mixed solvent) and HSP of the binder in the active material layer may be greater than or equal to 8.0. The HSP of the mixed solvent may be obtained by applying a weight value of each volume mixing ratio to one point of each solvent disposed in the three-dimensional space and then, calculating a mass center.

In embodiments where the active material layer includes a plurality of binders, all the binders in the active material layer may satisfy the relationship of the HSP distance to effectively (or suitably) prevent (or reduce) the swelling of the active material layer.

The organic solvent may be, for example, included in an amount of greater than or equal to about 50 wt %, and in some embodiments, greater than or equal to about 70 wt % and less than or equal to about 100 wt %, based on a weight of the active material layer, which may satisfy the HSP distance with respect to all the binders of the active material layer.

HSP of each solvent may be obtained by using, for example, a software database of Hansen Solubility Parameter in Practice (4th Edition) and/or the like.

The HSP of the active material layer binder may be obtained as follows. The binder (in a dry solid state) is dipped in a solvent having a known HSP to measure a weight swelling degree regarding each solvent. The solvent used here may be a hydrophilic solvent and/or a hydrophobic solvent (such as dimethyl sulfoxide, acetonitrile, dimethyl formamide, methanol, ethanol, 1-butanol, 1,4-dioxane, tetrahydrofuran, toluene, methylethylketone, acetone, N-methyl-2-pyrrolidone, n-hexane, cyclohexane, methylisobutylketone, n-butyl acetate, chloroform, methyl acetate, pyridine, hexafluoro isopropanol, diethylene glycol, γ-butyrolactone, 2-aminoethanol, cyclo hexanone, 1,1,2,2-tetrabromoethane, 1-bromo naphthalene, aniline, and/or the like), or a mixture thereof. Each solvent having the weight swelling degree of greater than or equal to about 3.0 is classified as a "swelling solvent" and each solvent having the weight swelling degree of less than 3.0 is classified as a "non-swelling solvent". Regarding each solvent used in a test of disposing each solvent in a HSP three-dimensional space, a sphere including points of solvents classified into a "swelling solvent" and not including points of solvents classified into a "non-swelling solvent" is mapped out. When a radius of the sphere is maximized, a central coordinate of the sphere is regarded as HSP of the active material layer binder.

The solvent may include water. The water has high solubility for the binder of the active material layer, and may be appropriate for dispersion of the polyolefin-based polymer particle and/or the insulating inorganic particle of the composition for preparing the porous insulating layer. An amount of water in the solvent may be greater than or equal to about 20 wt % and less than or equal to about 70 wt %, for example, greater than or equal to about 30 wt % and less than or equal to about 50 wt %. In addition, since commercially available dispersion of the polyolefin-based polymer particle generally includes water, the water in the dispersion may constitute at least a part of the water in the solvent.

In the composition for preparing the porous insulating layer, an amount of the solvent is not particularly limited, and may be selected according to desirable coating conditions, for example, may be greater than or equal to about 15 wt % and less than or equal to about 60 wt %, for example, greater than or equal to about 20 wt % and less than or equal to about 45 wt %.

The composition for preparing the porous insulating layer according to the present embodiment includes a polymer including the monomer units (A) and (B) as a binder along with the polyolefin-based polymer particle. Although the composition for preparing the porous insulating layer also includes an organic solvent, it still shows excellent (or suitable) dispersion stability of the polyolefin-based polymer particle. As a result, a water content in the solvent may be reduced, and a thickness increase of the active material layer may be suppressed. In addition, when the composition for preparing the porous insulating layer is coated on an active material layer, the polyolefin-based polymer particle may be uniformly dispersed in the porous insulating layer. In addition, the composition for preparing the porous insulating layer may show excellent (or suitable) solubility of the binder and/or the like, excellent (or suitable) dispersibility of the insulating inorganic particle, and excellent (or suitable) coating property. A non-aqueous electrolyte rechargeable battery having a porous insulating layer formed of the composition for preparing a porous insulating layer of the present embodiments may show an excellent shut-down function due to the polyolefin-based polymer particle and excellent safety performance due to uniformity of the porous insulating layer. In addition, an undesired thickness increase of the active material layer contacting with the porous insulating layer may be suppressed or reduced.

2. Structure of Non-Aqueous Electrolyte Rechargeable Battery

Hereinafter, referring to the drawing, a specific structure of a non-aqueous electrolyte rechargeable battery 10 according to an embodiment of the present disclosure is described.

The drawing is an explanation view showing a schematic structure of a non-aqueous electrolyte rechargeable battery according to an embodiment.

The non-aqueous electrolyte rechargeable battery 10 includes a negative electrode 30 (that is the electrode for a non-aqueous electrolyte rechargeable battery according to an embodiment of the present disclosure). The non-aqueous electrolyte rechargeable battery 10 of the drawing is an example of a rechargeable battery according to the present embodiment. As shown in the drawing, the non-aqueous electrolyte rechargeable battery 10 includes a positive electrode 20, the negative electrode 30, and a separator layer 40. The shape of the non-aqueous electrolyte rechargeable battery 10 is not particularly limited, but it may be for example, cylindrical, prismatic, laminate-type (or kind), button-type (or kind), and/or the like.

The positive electrode 20 includes a current collector 21 and a positive active material layer 22. The current collector 21 may use any suitable conductor (conducting material) and may be, for example, aluminum (Al), stainless steel, and/or nickel-plated steel.

The positive active material layer 22 includes at least a positive active material and a conductive agent and may further include a binder (binder for a positive active material layer). The amount of each of the positive active material, the conductive agent, and the binder are not particularly limited, and may be any amount suitable for application in a non-aqueous electrolyte rechargeable battery.

The positive active material may be, for example, a transition metal oxide including lithium and/or a solid solution oxide, and may be any suitable material capable of electrochemically intercalating and deintercalating lithium ions without particular limitation.

The transition metal oxide including lithium may be a Li.Co-based composite oxide (such as $LiCoO_2$), a Li.Ni.Co.Mn-based composite oxide (such as $LiNi_xCo_yM-n_zO_2$), a Li.Ni-based composite oxide (such as $LiNiO_2$), and/or a Li.Mn-based composite oxide (such as $LiMn_2O_4$). The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, $0.10 \leq z \leq 0.3$), $LiMn_{1.5}Ni_{0.5}O_4$, and/or the like. An amount (content ratio) of the positive active material is not particularly limited, and may be any amount suitable for application in a positive active material layer of a non-aqueous electrolyte rechargeable battery. The compound for the positive active material may be used alone or as a mixture of two or more.

The conductive agent may be, for example, carbon black (such as ketjen black and/or acetylene black), natural graphite, artificial graphite, fiber-shaped carbon (such as carbon nanotube, graphene, carbon nanofibers and/or the like), and/or a composite of the fiber-shaped carbon and carbon black. However, the conductive agent is not particularly limited as long as it increases conductivity of the positive electrode. An amount of the conductive agent is not particularly limited and may be any amount suitable for application in a positive active material layer of a non-aqueous electrolyte rechargeable battery.

The binder for a positive active material layer may be, for example, a fluorine-containing resin (such as polyvinylidene fluoride, polyvinylidene difluoride, and/or the like), a styrene-containing resin (such as a styrene butadiene rubber, and/or the like), an ethylene-propylene-diene terpolymer, an acrylonitrile-butadiene rubber, a fluoroelastomer, polyvinyl acetate, polymethylmethacrylate, polyethylene, polyvinyl alcohol, and/or carboxymethyl celluloses (such as carboxymethyl cellulose or a derivative thereof (for example a salt of carboxy methyl cellulose), and/or nitrocellulose). The binder is not particularly limited as long as it binds the positive active material and the conductive agent on the current collector 21 and has oxidation resistance to endure a high potential of a positive electrode and electrolyte solution stability. An amount of the binder is not particularly limited and may be any amount suitable for application in a positive active material layer of a non-aqueous electrolyte rechargeable battery.

The positive active material layer 22 may be, for example, manufactured by dispersing a positive active material, a conductive agent, and a binder in an appropriate organic solvent (for example, N-methyl-2-pyrrolidone) to prepare positive electrode slurry and coating the positive electrode slurry on a current collector 21, followed by drying and compressing the same. A density of the positive active material layer 22 after compression is not particularly limited and may be any density suitable for application in a positive active material layer of a non-aqueous electrolyte rechargeable battery.

The negative electrode 30 is an example of a negative electrode for a rechargeable battery according to the present embodiment. The negative electrode 30 includes a thin-film current collector 31, a negative active material layer 32 disposed (e.g., positioned) contacting the current collector 31, and a porous insulating layer 33 disposed on the negative active material layer 32.

The current collector 31 is not particularly limited but may be, for example, made of copper, aluminum, iron, nickel, stainless steel or an alloy thereof or steel plated therewith, for example, nickel-plated steel.

The current collector 31 may be made of copper and/or nickel or an alloy thereof.

The negative active material layer 32 contacts the current collector 31, and more specifically, one main surface of the negative active material layer 32 is adhered on the current collector 31. The negative active material layer 32 includes at least negative active material. In an embodiment, the negative active material layer 32 includes a negative active material and a binder (a binder for a negative active material layer).

The negative active material is not particularly limited as long as it is a material capable of electrochemically intercalating and deintercalating lithium ions and may be, for example, a graphite active material (artificial graphite, natural graphite, a mixture of artificial graphite and natural graphite, and/or natural graphite coated with artificial graphite), a Si-based active material or a Sn-based active material (for example, particulates such as silicon (Si) or tin (Sn) or oxides thereof, and/or alloys of silicon or tin as a basic material), metal lithium, and/or a titanium oxide-based compound such as $Li_4Ti_5O_{12}$. The negative active material may include at least one of the materials described above. The oxide of silicon is represented by $SiO_x$ ($0 \leq x \leq 2$).

An amount of the negative active material of the negative active material layer 32 is not particularly limited but may be, for example, about 60.0 wt % to 100 wt %, for example, about 80 wt % to about 99.5 wt %, or about 90 wt % to about 99 wt %.

The binder of the negative active material layer 32 may be the same as the binder of the positive active material layer 22. Among the materials, at least one binder of the styrene-containing resin, the fluorine-containing resin, polyethylene, polyvinyl alcohol, and carboxymethyl celluloses may be used. The styrene-containing resin may be a styrene butadiene rubber, and the fluorine-containing resin may be polyvinylidene fluoride. The carboxymethyl celluloses may be carboxymethyl cellulose, and/or a carboxymethyl cellulose derivative such as a salt of carboxymethyl cellulose. The salt of carboxymethyl cellulose may be, for example, a salt of carboxymethyl cellulose and an alkali metal ion, for example, sodium carboxymethyl cellulose, potassium carboxymethyl cellulose, lithium carboxymethyl cellulose, and/or the like.

An amount of the binder of the negative active material layer 32 is not particularly limited and may be, for example, about 0 wt % to about 40 wt %, for example about 0.5 wt % to about 20 wt %, or about 1 wt % to about 10 wt %.

The negative active material layer 32 may be manufactured by, for example, dispersing the negative active material and the binder in an appropriate solvent (e.g., water, and/or the like) to prepare negative electrode slurry and coating the negative electrode slurry on a current collector 31 followed by drying and compressing the same. A thickness of the negative active material layer 32 after compression is not particularly limited and may be any thickness suitable for application in a negative active material layer of a lithium ion rechargeable battery. The negative active material layer 32 may optionally include a graphite active material.

The negative active material layer 32 may be manufactured by a physical deposition method and/or a chemical deposition method (such as thermal evaporation, ion plating, sputtering and/or the like), besides the above method.

The porous insulating layer 33 may be formed on the negative active material layer 32 so that it may be disposed between the negative electrode 30 and the separator layer 40. The porous insulating layer 33 may prevent or reduce the risk of an undesirable short-circuit of the non-aqueous electrolyte rechargeable battery 10. In the present embodiment, the porous insulating layer 33 is manufactured by coating the composition for preparing the porous insulating layer and drying the same. In some embodiments, the porous insulating layer includes the polyolefin-based polymer particle and the binder and may include, for example, an insulating inorganic particle. The insulating inorganic particle, the binder, and the polyolefin-based polymer particle are the same as described above.

Since the porous insulating layer 33 is formed of the composition for preparing the porous insulating layer having excellent coating property, the porous insulating layer 33 may have a relatively uniform layer structure and thickness. For example, in the porous insulating layer 33, the insulating inorganic particle and/or the polyolefin-based polymer particle are uniformly dispersed. Accordingly, a basic function of the porous insulating layer 33, for example, an insulation function of the insulating inorganic particle and/or a shutdown function of the polyolefin-based polymer particle may appropriately work therein.

The composition for preparing the porous insulating layer includes an organic solvent as a solvent and thus may suppress or reduce a thickness increase of the negative active material layer 32 due to formation of the porous insulating layer 33.

In some embodiments, the separator layer 40 includes a separator and an electrolyte solution. The separator is not particularly limited, and any suitable separator for a lithium ion rechargeable battery may be used.

The separator may be a porous film or a non-woven fabric having excellent (or suitable) high rate discharge performance alone or in a combination thereof. The separator may be coated with an inorganic material such as $Al_2O_3$, $Mg(OH)_2$, $SiO_2$, and/or the like, and the inorganic material may be included as a filler.

Materials constituting the separator may be, for example, a polyolefin-based resin (such as polyethylene, polypropylene and/or the like), a polyester-based resin (such as polyethylene terephthalate, polybutylene terephthalate, and/or the like), polyvinylidene fluoride, a vinylidene fluoride-hexafluoro propylene copolymer, a vinylidene fluoride-perfluoro vinyl ether copolymer, a vinylidene fluoride-tetrafluoro ethylene copolymer, a vinylidene fluoride-trifluoro ethylene copolymer, a vinylidene fluoride-fluoro ethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoro ethylene-hexafluoro propylene copolymer, a vinylidene fluoride-ethylene-tetrafluoro ethylene copolymer, and/or the like. A porosity of the separator is not particularly limited, and the separator may have any porosity suitable for application in a lithium ion rechargeable battery.

The electrolyte solution may include an electrolytic salt and a solvent.

The electrolytic salt may be an electrolyte such as a lithium salt and/or the like. The electrolytic salt may be, for example, an inorganic ion salt including at least one selected from lithium (Li), sodium (Na), and potassium (K) (such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$, $KSCN$, and/or the like), and/or an organic ion salt (such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octyl sulfonate, lithium dodecyl benzenesulfonate, and/or the like). The electrolytic salt may be used alone or in a mixture of two or more. A concentration of the electrolytic salt is not particularly limited but may be, for example, about 0.5 mol/L to about 2.0 mol/L.

The solvent is a non-aqueous solvent that dissolves the electrolytic salt. The solvent may be, for example, selected from cyclic carbonate esters (such as propylene carbonate, ethylene carbonate, butylene carbonate, chloro ethylene carbonate, vinylene carbonate, and/or the like), cyclic esters (such as γ-butyrolactone, γ-valero lactone, and/or the like), linear carbonates (such as dimethyl carbonate, diethyl carbonate, ethylmethyl carbonate, and/or the like), linear esters (such as methyl formate, methyl acetate, methyl butyrate, and/or the like), tetrahydrofuran or a derivative thereof, ethers (such as 1,3-dioxane, 1,4-dioxane, 1,2-dimethoxy ethane, 1,4-dibutoxyethane, methyl diglyme, and/or the like), nitriles (such as acetonitrile, benzonitrile, and/or the like), dioxolane or a derivative thereof, ethylene sulfide, sulfolane, sultone, and derivatives thereof, which may be used alone or as a mixture of two or more. When the solvent is used as a mixture of two or more, a mixing ratio of each solvent may be any mixing ratio suitable for a lithium ion rechargeable battery.

The electrolyte solution may further include various additives such as a negative electrode SEI (Solid Electrolyte Interface) forming agent, a surfactant, and/or the like.

Such additives may be, for example, succinic anhydride, lithium bis(oxalate)borate, lithium tetrafluoroborate, a dinitrile compound, propane sultone, butane sultone, propene sultone, 3-sulfolene, fluorinated arylether, fluorinated acrylate, and/or the like. Concentrations of such additives may be any concentration suitable for a lithium ion rechargeable battery.

In the non-aqueous electrolyte rechargeable battery 10 described above, the composition for preparing the porous insulating layer according to the present embodiment is used to form the porous insulating layer 33 during preparation of the negative electrode 30. Accordingly, the porous insulating layer 33 may be relatively uniformly formed and thus insulation function and/or a shut-down function (due to the polyolefin-based polymer particle) of the porous insulating layer 33 may be endowed (e.g., suitably achieved). As a result, a safety performance of the non-aqueous electrolyte rechargeable battery 10 may be improved, and undesirable film thickness increase of the negative active material layer 32 adjacent to the porous insulating layer 33 may be suppressed or reduced.

While in the present embodiment, the negative electrode 30 includes the porous insulating layer 33, the present disclosure is not limited thereto. For example, the positive electrode 20 may include a porous insulating layer and in this case, the negative electrode 30 may not include a porous insulating layer.

3. Method of Preparing Non-Aqueous Electrolyte Rechargeable Battery

A method of preparing a non-aqueous electrolyte rechargeable battery 10 is described.

A method of preparing the non-aqueous electrolyte rechargeable battery 10 according to the present embodiment includes forming a porous insulating layer using a composition for preparing a porous insulating layer on an active material layer disposed on a current collector. However, the method of preparing the non-aqueous electrolyte rechargeable battery 10 is not limited to the following method but may include any suitable preparing method.

The positive electrode 20 is prepared as follows. First, a positive active material, a conductive agent, and a binder are mixed in a desirable (or suitable) ratio and then dispersed in an organic solvent (for example, N-methyl-2-pyrrolidone) to prepare positive electrode slurry. Next, the positive electrode slurry is formed (for example, coated) on the current collector 21 and dried to manufacture the positive active material layer 22.

Here, the coating method is not particularly limited, but may be performed by using, for example, a knife coater, a gravure coater, and/or the like.

Hereinafter, each coating may be performed by the same method. Then, the positive active material layer 22 may be compressed with a press to a desirable (or suitable) thickness, thus preparing the positive electrode 20. The thickness of the positive active material layer 22 is not particularly limited and may be any thickness of a positive active material layer suitable for application in a non-aqueous electrolyte rechargeable battery.

The negative electrode 30 may be prepared by substantially the same method as the method of preparing the positive electrode 20. First, the negative active material and a binder are mixed in a desirable (or suitable) ratio to disperse them in a solvent (for example, water) and to prepare negative electrode slurry. In some embodiments, the negative electrode slurry may optionally include a graphite active material.

Subsequently, the negative electrode slurry is formed (for example, coated) on the current collector 31, and then dried to form a negative active material layer 32. Then, the negative active material layer 32 is compressed with a press to a desirable (or suitable) thickness. The thickness of the negative active material layer 32 is not particularly limited and may be any thickness of a negative active material layer suitable for application in a non-aqueous electrolyte rechargeable battery.

Then, a porous insulating layer 33 is formed using the composition for preparing the porous insulating layer. For example, the composition for preparing the porous insulating layer is coated on the negative active material layer 32 and dried to form the porous insulating layer 33. Thus, the negative electrode 30 is prepared.

When the porous insulating layer 33 is formed using the composition for preparing the porous insulating layer according to the present embodiments, swelling of the negative active material layer 32 may be suppressed or reduced during coating the composition for preparing the porous insulating layer. As a result, a shut-down function due to the polyolefin-based polymer particle in the porous insulating layer 33 and/or an insulation function due to the insulating inorganic particle may be firmly ensured. Accordingly, a safety performance of the prepared non-aqueous electrolyte rechargeable battery 10 may be improved. During the coating of the composition for preparing the porous insulating layer, an undesirable film thickness increase of the negative active material layer 32 may be suppressed or reduced.

The separator 40 may be disposed (e.g., positioned) between the positive electrode 20 and the negative electrode 30 to prepare an electrode structure. Then, the electrode structure is shaped to have a desired shape (for example, a cylinder, a prism, a laminate, a button shape, and/or the like) and then inserted into a container having the shape. Then, the electrolyte solution is injected into the container and impregnated into each pore of the separator 40. Thus, the non-aqueous electrolyte rechargeable battery 10 is prepared.

While in the present embodiment, the porous insulating layer 33 is formed on the negative active material layer 32, the present disclosure is not limited thereto. For example, a porous insulating layer may be formed on the positive active material layer 22 using the composition for preparing the porous insulating layer of the present embodiments. In this case, it is not necessary that a porous insulating layer is formed on the negative active material layer 32.

EXAMPLES

Hereinafter, the present disclosure is described with reference to specific examples in more detail. However, the following examples are provided for illustrative purposes only and the present disclosure is not limited to the following examples.

Synthesis of Binder for Porous Insulating Layer
Synthesis of Binder 1

70.6 mg of azoisobutyronitrile, 10.0 g of N-vinyl formamide, 9.5 g of acryloyl morpholine, and 0.5 g of acrylic acid were put in a 500 ml flask equipped with an agitator and a thermometer and then, stirred, and 180.0 g of triethylene glycol monomethyl ether (boiling point at 1 atm: 249° C.) and 0.424 g of ethanolamine were sequentially mixed therewith. After substituting nitrogen inside the system, the obtained mixture was heated up to 65° C. and reacted for 12 hours while stirred at 600 rpm. After the reaction was complete, non-volatile components in the solution were measured to be 9.7 wt % (conversion rate: 96%). Subsequently, initiator residues and non-reacted monomers were removed from the solution after the reaction through heating and distillation under a reduced pressure.

The resulting solution was cooled down to room temperature, and ethanol amine was added thereto to adjust to pH 8, thus preparing a copolymer solution. A solid content therein was 10%.

Synthesis of Binder 2

A copolymer solution having a solid content of 10% was synthesized according to the same (or substantially the same) method as the synthesis of Binder 1 except that an amount of N-vinyl formamide was 11.0 g, an amount of acryloyl morpholine was 9.0 g, and acrylic acid and ethanolamine were not added.

Synthesis of Binder 3

A copolymer solution having a solid content of 10% was synthesized according to the same (or substantially the same) method as the synthesis of Binder 2 except that an amount of N-vinyl formamide was 15.0 g and an amount of acryloyl morpholine was 5.0 g.

Synthesis of Binder 4

A copolymer solution having a solid content of 10% was synthesized according to the same (or substantially the same) method as the synthesis of Binder 2 except that an amount of N-vinyl formamide was 18.0 g and an amount of acryloyl morpholine was 2.0 g.

Synthesis of Binder 5

A copolymer solution having a solid content of 10% was synthesized according to the same (or substantially the same) method as the synthesis of Binder 2 except that an amount of N-vinylformamide was 6.0 g and an amount of acryloyl morpholine was 14.0 g.

Synthesis of Binder 6

A copolymer solution having a solid content of 10% was synthesized according to the same (or substantially the same) method as the synthesis of Binder 1 except that an amount of N-vinylformamide was 10.0 g, an amount of acryloyl morpholine was 8.0 g, an amount of acrylic acid was 2.0 g, and an amount of ethanol amine was 1.70 g.

Preparation of Electrode

Graphite, a carboxymethyl cellulose sodium salt, and a styrene-butadiene rubber (SRB) aqueous dispersion were dissolution-dispersed in a solid weight ratio of 97.5:1.0:1.5 in a water solvent to prepare negative active mass slurry. Subsequently, the negative active mass slurry was coated to be 10 μm thick on both surfaces of a copper foil current collector, dried, and compressed with a roll press to prepare a negative electrode. The negative electrode coating amount was 26 mg/cm$^2$ (on both surfaces) and an electrode density was 1.65 g/cm$^3$.

Preparation of Composition for Preparing Porous Insulating Layer

Example 1

Ion exchange water in the same amount as that of triethylene glycol monomethyl ether included in Binder 1 was added to Binder 1 to prepare a mixed solvent solution including the triethylene glycol monomethyl ether and the ion exchange water in a weight ratio of 1:1 (solid content: 5.3%). This mixed solvent solution was mixed with boehmite particles having an average particle diameter (D50) of 0.9 μm in a solid weight ratio of 5:45, which were dispersed with a beads mill to obtain a dispersion (solid content: 35.7%). In addition, to an aqueous dispersion of polyethylene wax (average particle diameter: 1 μm and solid content: 40 wt %), triethylene glycol monomethyl ether in the same amount as that of water was slowly added, while stirring, to prepare a mixed solvent dispersion of polyethylene wax (solid content: 25.0%). The above dispersion was mixed with the mixed aqueous dispersion of polyethylene wax in a weight ratio of 28:36 and then, stirred therewith with a planetary mixer to prepare a composition for preparing a porous insulating layer (a final solid content: 30%).

The composition for preparing the porous insulating layer was placed (allowed to stand) for 1 day. After the placing, the composition for preparing the porous insulating layer was liquid. The composition for preparing the porous insulating layer was then stirred for 30 seconds with a planetary mixer, and then, when a particle diameter was measured at a grind gauge of 50 μm, a clear (e.g., noticeable) agglomerate (material) was not found. After setting a liquid temperature of the composition for preparing the porous insulating layer at 25° C., viscosity of the composition was measured by using a distortion-control type Rheometer, MCR302 made by Anton Paar GmbH. A shear rate started to be measured from 1 s$^{-1}$ and then, linearly accelerated up to 100 s$^{-1}$ for 60 seconds. As for a plate, a cone plate having a diameter of 50 mm and an angle of 1° was used. Subsequently, (viscosity at a shear rate of 10 s$^{-1}$) was divided by (viscosity at a shear rate of 100 s$^{-1}$) to obtain a thixotropic index (TI).

The composition for preparing the porous insulating layer was coated by using a wire bar to be respectively 3 μm thick on both surfaces of a negative electrode after the drying. The drying was performed at 60° C. for 15 minutes in an oven. Thickness of each negative electrode layer (active material layer of the negative electrode) having the porous insulating layer was measured and compared with the respective thickness of the negative active material layer before forming the porous insulating layer to calculate a film thickness increment per each surface.

The thicknesses of the negative electrode layer and the porous insulating layer were measured by processing a cross section of the electrode with a Cryo cross-section polisher, examining them with a scanning electron microscope (SEM) to average each thickness measurements at 10 viewing angle. In addition, Table 1 shows a difference between SP values of triethylene glycol monomethylether and an electrode binder (binder for a negative active material), a boiling point of triethylene glycol monomethylether, and a thickness change of the electrode layer (active material layer of the negative electrode). HSP of the triethylene glycol monomethylether was cited from Hansen Solubility Parameter in Practice (4th Edition). HSP of the negative active material layer binder was experimentally obtained by a method described above, using a solvent whose HSP is known. These measurements were obtained in the same manner for the solvents and negative active material layer binders of other examples and comparative examples.

Example 2

A composition for preparing a porous insulating layer was prepared according to the same (or substantially the same) method as in Example 1 except that Binder 2 was used instead of Binder 1. Subsequently, a TI value of the composition for preparing the porous insulating layer was calculated. In addition, the obtained composition for preparing the porous insulating layer was coated on a negative electrode layer. The results are shown in Table 1.

Example 3

A composition for preparing a porous insulating layer was prepared according to the same (or substantially the same) method as in Example 1 except that Binder 3 was used instead of Binder 1. Subsequently, a TI value of the composition for preparing the porous insulating layer was calculated. In addition, the obtained composition for preparing the porous insulating layer was coated on a negative electrode layer. The results are shown in Table 1.

Comparative Example 1

A composition for preparing a porous insulating layer was prepared according to the same (or substantially the same) method as in Example 1 except that Binder 4 was used instead of Binder 1.

The composition for preparing the porous insulating layer was placed (allowed to stand) for 1 day. After the placing, when a phase of the composition for preparing the porous insulating layer was examined, a sticky precipitate was found, and in addition, the composition for preparing the porous insulating layer was partially gellized. This composition for preparing the porous insulating layer was impossible to coat on a negative electrode layer. The results are shown in Table 1.

Comparative Example 2

A composition for preparing a porous insulating layer was prepared according to the same (or substantially the same) method as in Example 1 except that Binder 5 was used instead of Binder 1. The composition for preparing the porous insulating layer was placed for 1 day. After the placing, the composition for preparing the porous insulating layer was liquid. The composition for preparing the porous insulating layer was stirred for 30 seconds with a planetary mixer, and when a particle diameter of the composition was examined at a grind gauge of 50 μm, an agglomerate having a diameter of 30 μm was found. Subsequently, a TI value of the composition for preparing the porous insulating layer was calculated.

Since the composition for preparing the porous insulating layer could not be properly coated on a negative electrode layer due to the formed agglomerate, a thickness change of the negative active material layer could not be measured. The results are shown in Table 1.

Comparative Example 3

A composition for preparing a porous insulating layer was prepared according to the same (or substantially the same) method as in Example 1 except that Binder 6 was used instead of Binder 1. The composition for preparing the porous insulating layer was placed for 1 day. After the placing, when a phase of the composition for preparing the porous insulating layer was examined, an adhesive precipitate was found, and in addition, the composition for preparing the porous insulating layer was partially gellized. Accordingly, the composition for preparing the porous insulating layer was impossible to coat on a negative electrode layer. The results are shown in Table 1.

Comparative Example 4

An aqueous solution of a sodium salt of carboxymethyl cellulose was mixed with the boehmite particle used in Example 1 in a solid weight of 1:45, and the mixture was dispersed with a beads mill to prepare a dispersion (solid content: 30 wt %). Subsequently, aqueous dispersion of polyethylene wax (average particle diameter: 1 μm and solid content: 40 wt %) and an aqueous dispersion of an acryl-based rubber (solid content: 40 wt %) were mixed with the prepared dispersion in a solid weight ratio of 46:50:4 (aqueous dispersion of polyethylene wax:aqueous dispersion of acryl-based rubber:dispersion).

Deionized water (as a water solvent) was added to the obtained mixed solution to prepare a composition for preparing a porous insulating layer having solid content of 30 wt %. In the prepared composition for preparing the porous insulating layer, the binder (Binder 7) was a mixture of a carboxymethyl cellulose sodium salt and an acryl-based rubber. The evaluation of the states of the composition for preparing the porous insulating layer and coating the same on the negative electrode were performed in the same manner as in Example 1. The results are shown in Table 1.

Comparative Example 5

An N-methyl-2-pyrrolidone (NMP) solution of acid-modified polyvinylidene fluoride was mixed with the boehmite particle used in Example 1 in a solid weight ratio 5:45, and the mixture was dispersed with a beads mill to prepare a dispersion (solid content: 30 wt %). Subsequently, the dispersion was mixed with an aqueous dispersion of polyethylene wax (average particle diameter: 1 μm, solid content: 40 wt %) in a solid content ratio of 50:50 to obtain a composition for preparing the porous insulating layer. However, acid-modified polyvinylidene fluoride was precipitated during the mixing process, and in addition, the polyethylene wax dispersion was immediately agglomerated and became gellized without liquidity. Accordingly, the composition for preparing the porous insulating layer could not be coated on a negative electrode in the same process as performed in Example 1. In the composition for preparing the porous insulating layer, acid-modified polyvinylidene fluoride was used as a binder (Binder 8).

In Table 1, "TEmMe" denotes triethylene glycol monomethylether, "NMP" denotes N-methyl-2-pyrrolidone, "SBR" denotes a styrene butadiene rubber, and "CMC" denotes a carboxymethyl cellulose sodium salt, respectively.

insulating layer according to Comparative Example 2 could not be appropriately coated, because a rough and crude agglomerate was formed therein. Furthermore, the composition for preparing the porous insulating layer according to Comparative Example 4 was an aqueous composition and thus could not suppress a thickness increase of an active material layer. In addition, the composition for preparing the porous insulating layer according to Comparative Example 5 was gellized right after it was prepared and thus could not be coated from the beginning.

Hereinbefore, example embodiments of the present disclosure were illustrated by referring to the accompanied drawing, but the present invention is not limited thereto.

As used herein, expressions such as "at least one of," "one of," and "selected from," when preceding a list of elements,

TABLE 1

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Binder | Kinds | Binder 1 | Binder 2 | Binder 3 | Binder 4 | Binder 5 | Binder 6 | Binder 7 | Binder 8 |
| Amount of monomer (wt %) | N-vinyl formamide | 50.0 | 55.0 | 75.0 | 90.0 | 30.0 | 50.0 | — | — |
| | acryloyl-morpholine | 47.5 | 45.0 | 25.0 | 10.0 | 70.0 | 40.0 | — | — |
| | acrylic acid | 2.5 | — | — | — | — | 10.0 | — | — |
| Solvent 1 | Kinds | TEmMe | TEmMe | TEmMe | TEmMe | TEmMe | TEmMe | water | NMP |
| | HSP distance with the binder for a negative active material (SBR) | 8.8 | 8.8 | 8.8 | 8.8 | 8.8 | 8.8 | 38.8 | 6.6 |
| | HSP distance with the binder for a negative active material (CMC) | 13.0 | 13.0 | 13.0 | 13.0 | 13.0 | 13.0 | 20.2 | 16.3 |
| Solvent 2 | Kinds | Water | Water | Water | Water | Water | Water | — | — |
| Composition for porous insulating layer (being placed for 1 day) | State | Liquid No agglomeration | Liquid No agglomeration | Liquid No agglomeration | A part of gel phase | Liquid Agglomeration (30 μm) | A part of gel phase | Liquid No agglomeration | Gel phase |
| | TI value | 1.4 | 1.9 | 1.5 | • | 2.5 | • | 1.1 | — |
| thickness increment amount (μm) of active material layer (negative electrode layer) | | 4.7 | 4.7 | 4.6 | — | — | — | 9.8 | — |

As shown in Table 1, even when the compositions for preparing the porous insulating layer according to Examples 1 to 3 was allowed to stand for 1 day, the compositions maintained a liquid state, and an agglomerate was not found therein. In addition, since the compositions for preparing the porous insulating layer had a TI value of less than or equal to 2, the compositions according to Examples 1 to 3 were relatively close to a Newtonian fluid. Accordingly, the compositions for preparing the porous insulating layer according to Examples 1 to 3 showed excellent dispersibility of the insulating inorganic particle and the polyolefin-based polymer particle and, also, stability as a coating composition and also a small viscosity change and thus excellent leveling property and in addition, turned out to be appropriate for forming a thin film.

In addition, the compositions for preparing the porous insulating layer according to Examples 1 to 3 were able to be appropriately coated on an active material layer. After the coating, a thickness increase of the active material layer was less than 5 μm, which was relatively small.

On the other hand, the compositions for preparing the porous insulating layer according to Comparative Examples 1 and 3 became partially gellized and thus could not be coated. In addition, the composition for preparing the porous modify the entire list of elements and do not modify the individual elements of the list. Further, the use of "may" when describing embodiments of the present invention refers to "one or more embodiments of the present invention."

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the present invention is not limited to the disclosed embodiments, but, on the contrary, is intended to cover various modifications and equivalent arrangements included within the spirit and scope of the appended claims and equivalents thereof.

DESCRIPTION OF SYMBOLS 10 non-aqueous electrolyte rechargeable battery
20 positive electrode
21 positive current collector
22 positive active material layer
30 negative electrode
31 negative current collector
32 negative active material layer
33 porous insulating layer
40 separator layer

What is claimed is:

1. A composition for preparing a porous insulating layer for a non-aqueous electrolyte rechargeable battery, the composition comprising:
   a polyolefin-based polymer particle;
   a binder;
   an insulating inorganic particle; and
   a solvent comprising water and an organic solvent,
   the binder comprises a polymer,
   the polymer comprises at least one monomer unit (A) represented by Chemical Formula 1 and at least one monomer unit (B) represented by Chemical Formula 2, and
   in the polymer, a weight ratio (A)/(B) of the monomer unit (A) to the monomer unit (B) ranges from about 40/60 to about 80/20:

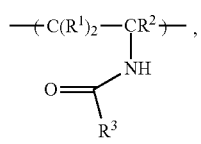

Chemical Formula 1 wherein,
$R^1$, $R^2$, and $R^3$ are each independently a hydrogen atom or a C1 to C3 alkyl group,

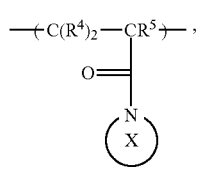

Chemical Formula 2 wherein,
$R^4$ and $R^5$ are each independently a hydrogen atom or a C1 to C3 alkyl group, and
X is selected from a heterocyclic group where at least one hydrogen is substituted with a C1 to C3 alkyl group, and an unsubstituted heterocyclic group,
wherein X comprises at least one nitrogen atom as a ring-forming atom.

2. The composition for preparing the porous insulating layer for a non-aqueous electrolyte rechargeable battery of claim 1, wherein the polymer comprises less than or equal to about 10 wt % of an ionic monomer unit.

3. The composition for preparing the porous insulating layer for a non-aqueous electrolyte rechargeable battery of claim 1, wherein X comprises a nitrogen atom and an oxygen atom.

4. The composition for preparing the porous insulating layer for a non-aqueous electrolyte rechargeable battery of claim 1, wherein a boiling point of the organic solvent at 1 atm is greater than or equal to about 160° C.

5. The composition for preparing the porous insulating layer for a non-aqueous electrolyte rechargeable battery of claim 1, wherein the organic solvent comprises a glycolalkylether-based compound.

6. An electrode for a non-aqueous electrolyte rechargeable battery, the electrode comprising:
   a current collector;
   an active material layer on the current collector and comprising an active material capable of electrochemically intercalating and deintercalating lithium ions; and
   a porous insulating layer on the active material layer and prepared using the composition for preparing the porous insulating layer of claim 1.

7. The electrode for a non-aqueous electrolyte rechargeable battery of claim 6, wherein the active material layer comprises a binder for an active material layer,
   wherein a distance between a Hansen solubility parameter of the binder for the active material layer and a Hansen solubility parameter of the organic solvent is greater than or equal to about 8.0 $(MPa)^{1/2}$.

8. A non-aqueous electrolyte rechargeable battery comprising the electrode for a non-aqueous electrolyte rechargeable battery of claim 6.

9. A method of preparing an electrode for a non-aqueous electrolyte rechargeable battery, the method comprising:
   forming a porous insulating layer utilizing a composition for preparing a porous insulating layer on an active material layer, the active material layer being formed on a current collector and comprising an active material capable of electrochemically intercalating and deintercalating lithium ions,
   wherein the composition for preparing the porous insulating layer comprises a polyolefin-based polymer particle, a binder, an insulating inorganic particle, and a solvent comprising water and an organic solvent,
   the binder comprises a polymer,
   the polymer comprises at least one monomer unit (A) represented by Chemical Formula 1 and at least one monomer unit (B) represented by Chemical Formula 2, and
   in the polymer, a weight ratio (A)/(B) of the monomer unit (A) to the monomer unit (B) ranges from about 40/60 to about 80/20:

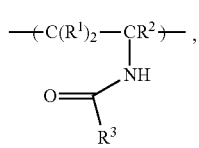

Chemical Formula 1 wherein, $R^1$, $R^2$ and $R^3$ are each independently a hydrogen atom or a C1 to C3 alkyl group, Chemical Formula 2

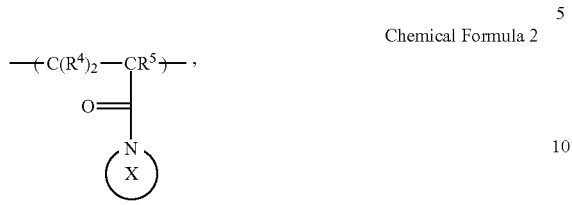

wherein $R^4$ and $R^5$ are each independently a hydrogen atom or a C1 to C3 alkyl group, and X is selected from a heterocyclic group where at least one hydrogen is substituted with a C1 to C3 alkyl group, and an unsubstituted heterocyclic group, wherein X comprises at least one nitrogen atom as a ring-forming atom.

10. The method of claim 9, wherein the polymer comprises less than or equal to about 10 wt % of an ionic monomer unit.

* * * * *